(No Model.)
D. A. ROBERTS.
PORTABLE WIRE REEL.
No. 327,195. Patented Sept. 29, 1885.
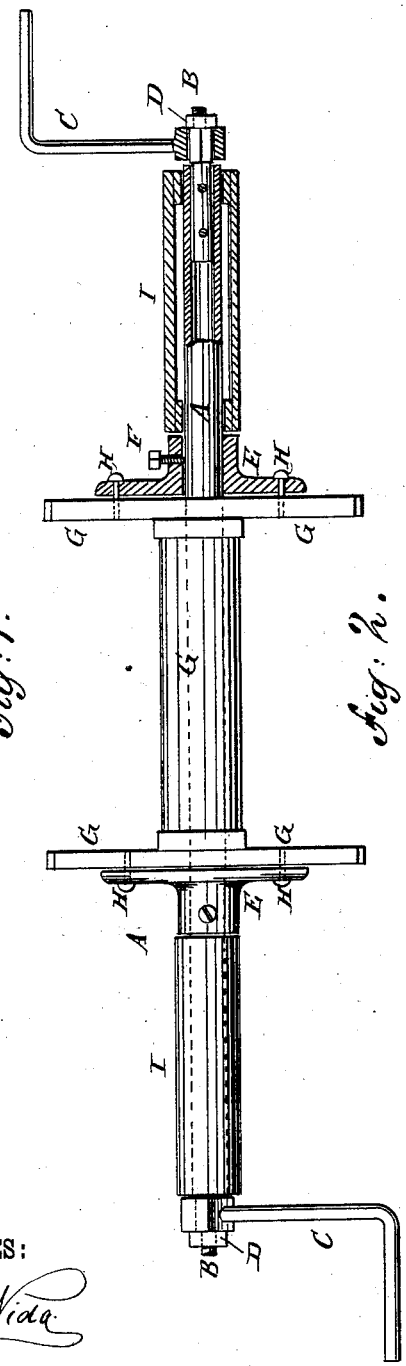
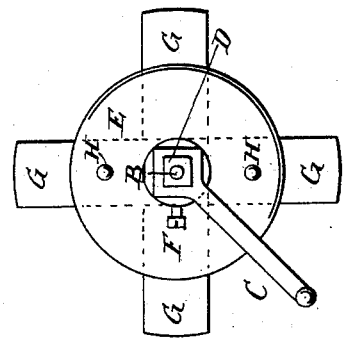
WITNESSES:
INVENTOR:
D. A. Roberts
BY Munn & Co.
ATTORNEYS.

UNITED STATES PATENT OFFICE.

DAVID A. ROBERTS, OF CRESTON, ILLINOIS.

PORTABLE WIRE-REEL.

SPECIFICATION forming part of Letters Patent No. 327,195, dated September 29, 1885.

Application filed August 18, 1884. (No model.)

*To all whom it may concern:*

Be it known that I, DAVID ARTHUR ROBERTS, of Creston, in the county of Ogle and State of Illinois, have invented a new and useful Improvement in Portable Wire-Reels, of which the following is a full, clear, and exact description.

Reference is to be had to the accompanying drawings, forming a part of this specification, in which similar letters of reference indicate corresponding parts in both the figures.

Figure 1 is a plan view of my improved wire-reel, partly in section. Fig. 2 is an end elevation of the same.

The object of this invention is to facilitate the unwinding of fence-wire, either barbed or plain, from spools and winding it thereon in putting up and taking down wire fences.

The invention consists in a wire-reel constructed with a shaft having a crank at each end, and provided with flanged collars to receive and rotate a wire-spool, and sleeves to adapt the reel to be rotated while being carried, and to protect the clothes of the operators from being injured, as will be hereinafter fully described.

A represents a shaft, which I prefer to make tubular, to allow it to be made light, while having sufficient strength and a suitable size.

Upon the ends of the shaft A are formed, or in them are secured, stems B, which are squared to receive cranks C, and have screws formed upon their outer ends to receive nuts D, for securing the said cranks in place detachably.

Upon the shaft A, upon the opposite sides of and equally distant from its center, are secured two flanged collars, E, one of which is permanently secured to the said shaft A by screws or rivets. The other flanged collar E is loose upon the shaft A, and is secured in place by a set-screw, F, passing through the hub of the said collar and resting against the side of the said shaft. The flanged collars E are placed at such a distance apart as to receive between them one of the spools G, upon which fence-wires are wound when sent to market. The spool G is secured to the flanged collars E by nails or pins H, so that the said spool will be revolved by and with the collars E and shaft A.

Upon the end parts of the shaft A, between the collars E and cranks C, are placed sleeves I, which may have bearing-boxes in their ends to lessen the friction, and which are designed to serve as handles in holding and carrying the reel, and as guards to prevent the clothes of the operators from being injured by the revolving shaft A. With this construction the collar secured by the set-screw and the sleeve and crank at that end of the shaft can be readily detached to allow a spool to be put on or taken off, as may be required.

The reel is designed to be carried and operated by two men, who each grasp a sleeve, I, with one hand, and a crank, C, with the other hand, so that they can turn the reel while carrying it.

Having thus described my invention, I claim as new and desire to secure by Letters Patent—

1. A wire-reel constructed substantially as herein shown and described, and consisting of the shaft A, having a crank, C, at each end, and provided with flanged collars E and sleeves I, whereby the reel is adapted to receive and rotate a wire-spool, as set forth.

2. In a wire-reel, the combination, with the shaft A, provided with the cranks C on its ends, of the flanged collars E, one of which is adjustably secured on the said shaft, substantially as herein shown and described, whereby provision is made for adapting the reel to different-sized spools, as set forth.

3. In a wire-reel, the combination, with the shaft A, having end cranks, C, and flanged collars E, of the sleeves I, substantially as herein shown and described, whereby the reel can be readily operated while being carried, and the clothes of the operators will be protected from injury, as set forth.

DAVID A. ROBERTS.

Witnesses:
E. M. GIBSON,
JOSEPH WHITE.